United States Patent
Chun et al.

(10) Patent No.: US 8,075,718 B2
(45) Date of Patent: Dec. 13, 2011

(54) MANUFACTURING METHOD FOR HEAVY-DUTY PNEUMATIC TIRE AND TIRE MANUFACTURED BY THE SAME

(75) Inventors: Yun Chang Chun, Daejeon (KR); Seung Il Min, Daejeon (KR)

(73) Assignee: Hankook Tire Co., Ltd., Seoul (KR)

( * ) Notice: Subject to any disclaimer, the term of this patent is extended or adjusted under 35 U.S.C. 154(b) by 595 days.

(21) Appl. No.: 12/290,276

(22) Filed: Oct. 28, 2008

(65) Prior Publication Data

US 2009/0133794 A1    May 28, 2009

(30) Foreign Application Priority Data

Nov. 23, 2007 (KR) .................. 10-2007-0120215
Sep. 2, 2008 (KR) .................. 10-2008-0086254

(51) Int. Cl.
*B29D 30/30* (2006.01)

(52) U.S. Cl. .......... 156/117; 156/87; 156/124; 152/531; 152/533

(58) Field of Classification Search .......... 152/529, 152/531, 533; 156/87, 177, 124, 130
See application file for complete search history.

(56) References Cited

U.S. PATENT DOCUMENTS

| 4,073,330 | A | * | 2/1978 | Allard | 152/530 |
| 5,221,382 | A | * | 6/1993 | Sid-Ahmed | 152/451 |
| 6,619,357 | B1 | * | 9/2003 | Gillard et al. | 152/531 |

* cited by examiner

*Primary Examiner* — Khanh P Nguyen
*Assistant Examiner* — Vishal I Patel
(74) *Attorney, Agent, or Firm* — Blakely, Sokoloff, Taylor & Zafman

(57) ABSTRACT

Disclosed are a method for manufacturing a heavy-duty pneumatic tire by winding a reinforcing belt disposed in a belt layer of a tread with an untopped spiral steel cord, and a tire manufactured by the same.

6 Claims, 6 Drawing Sheets

US 8,075,718 B2

MANUFACTURING METHOD FOR HEAVY-DUTY PNEUMATIC TIRE AND TIRE MANUFACTURED BY THE SAME

BACKGROUND OF THE INVENTION

1. Field of the Invention

The present invention relates to a manufacturing method for a heavy-duty tire and a tire manufactured by the same, and more particularly to a method for manufacturing a heavy-duty pneumatic tire by winding a reinforcing belt disposed in a belt layer of a tread with an untopped spiral steel cord, and a tire manufactured by the same.

2. Description of the Related Art

Recently, commercial vehicles such as a truck have been reducing height of a platform thereof in order to increase a loading space. According to this, there is a growing tendency to reduction of an outer diameter of a tire.

In addition, considering a fuel ratio of the vehicle, there have been made diverse efforts for reducing weight of the vehicle, one of which is a single tire comprising a single wheel instead of a dual wheel mounted to a commercial vehicle. Such a single wheel tire is so called a super single type tire, which is capable of not only reducing the weight of the tire but also reducing the number of required rims, accordingly helping reduce the vehicle weight.

The super single type tire has an even greater width and a lower aspect ratio than general heavy-duty tires. Due to the low aspect ratio, various members of the tire, especially a carcass and a belt, are subject to greater inner pressure and load, thereby deteriorating durability of the belt of the tire.

Furthermore, in case of inflation of the tire, an outer diameter of a tread center part is more increased than an outer diameter of a shoulder part. Therefore, a grounding portion is concentrated on the tread center part, which may cause deformation of the tread center part. Since such deformation deteriorates the durability of the belt as well as lifespan of the tire, there is an increasing need for reinforcing the tread.

Conventionally as well, structures of a reinforcing belt layer applied to a belt part of a tread to reinforce various members have been suggested. For example, U.S. Pat. No. 6,357,527 introduces a tire with a reinforcing belt layer 104 formed by spirally winding a single strand of steel cord 106 between a second belt and a third belt attached to a forming drum 101 as shown in FIG. 5. Although the effect as a reinforcing belt can be obtained by this tire, the manufacturing cost is increased since excessive time is required to wind the single strand of steel cord 106 between belts of a belt layer of a wide-width tire.

To overcome the above problems, there was introduced another reinforcing belt structure as shown in FIG. 6, which reinforces a reinforcing belt layer 204 by spirally winding a steel strip 206 constituted by a plurality of steel cords on a forming drum 201, as disclosed in US Patent No. 2005-0126674-A1. However, since the steel strip 206 has wide cut parts on both ends thereof, stress is concentrated on the cut parts, thereby damaging the belt.

SUMMARY OF THE INVENTION

Therefore, the present invention has been made in view of the above problems, and it is an object of the present invention to provide a manufacturing method for a heavy-duty pneumatic tire, which supplies and winds a plurality of strands of untopped steel cord simultaneously when positioning a reinforcing belt in a belt layer of a tire tread, and attaches rubber sheets between second and third belts of the belt layer prior to winding the untopped steel cord, and disposes a weft yarn between the untopped steel cord and an upper one of the rubber sheets, thereby solving problems of remaining air pockets, the manufacturing method being capable of effectively reducing the manufacturing time and improving durability of the belt, and a tire manufactured by the same.

In accordance with an aspect of the present invention, the above and other objects can be accomplished by the provision of a heavy-duty pneumatic tire formed by constructing a frame by connecting bead parts disposed on both sides through a carcass, attaching a tread and a side wall to the carcass, and disposing a reinforcing belt in a belt layer formed between the tread and the carcass, the heavy-duty pneumatic tire comprising a lower rubber sheet and an upper rubber sheet respectively attached to an upper surface of a second belt and a lower surface of the third belt; a plurality of strands of untopped steel cord supplied and wound between the upper and lower rubber sheets; and a weft yarn disposed between the upper rubber sheet and the reinforcing belt comprising the untopped steel cord, thereby constructing the belt layer.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Hereinafter, an exemplary embodiment of the present invention will be described in detail with reference to the accompanying drawings.

Figure 1:
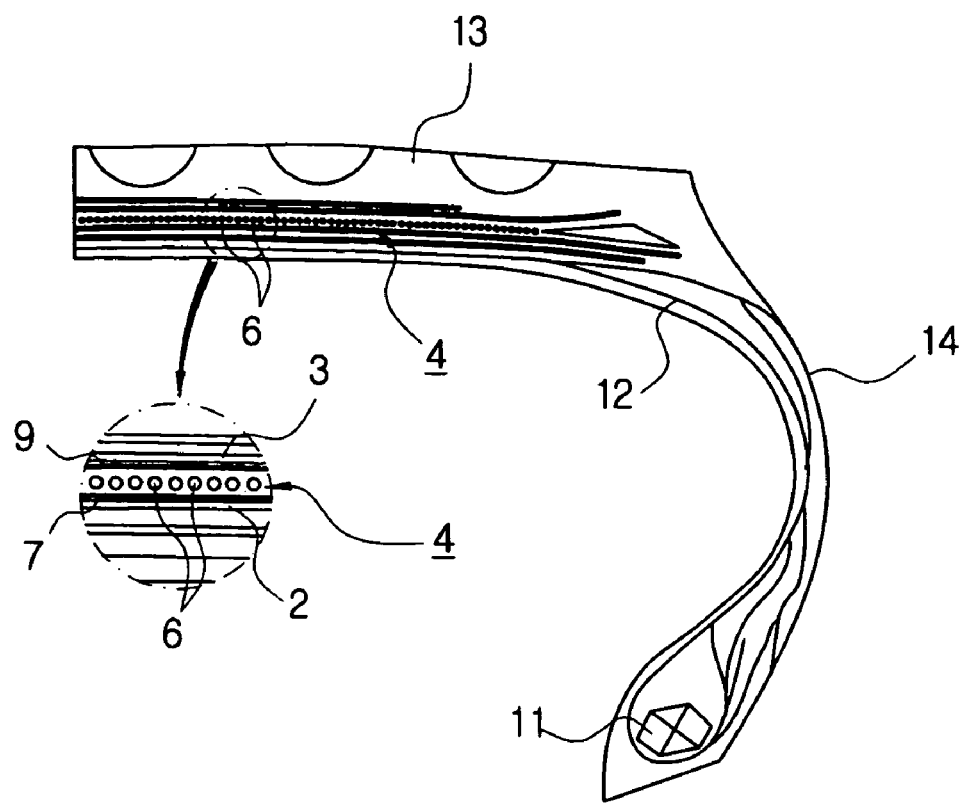
FIG. 1 is a partial sectional view of a heavy-duty pneumatic tire manufactured by a method according to an embodiment of the present invention.
Figure 2:
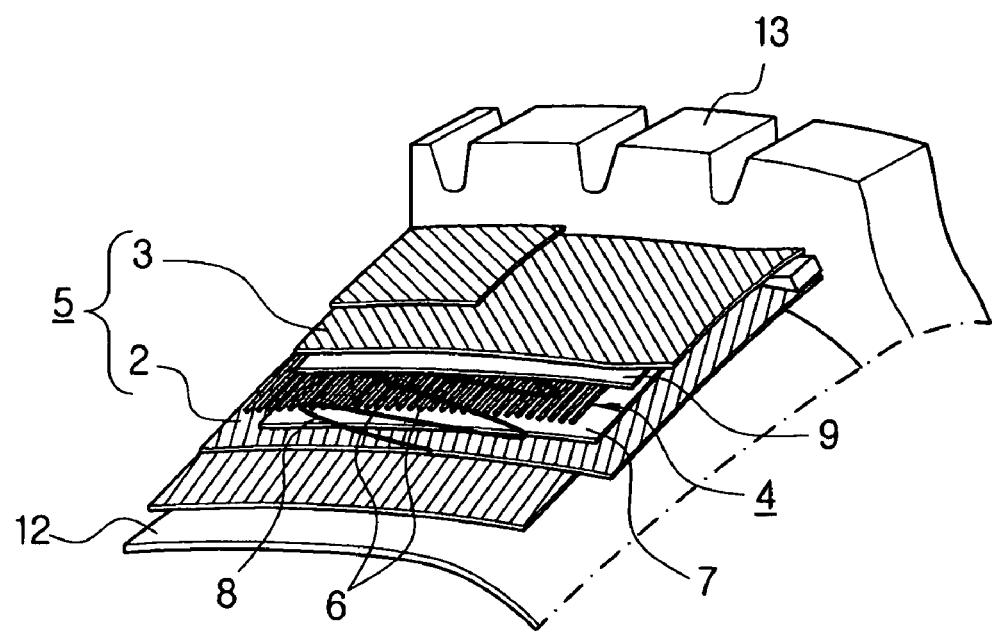
FIG. 2 is a partially-cut and enlarged perspective view showing main parts of the heavy-duty pneumatic tire manufactured by the method according to the embodiment of the present invention.
Figure 3:
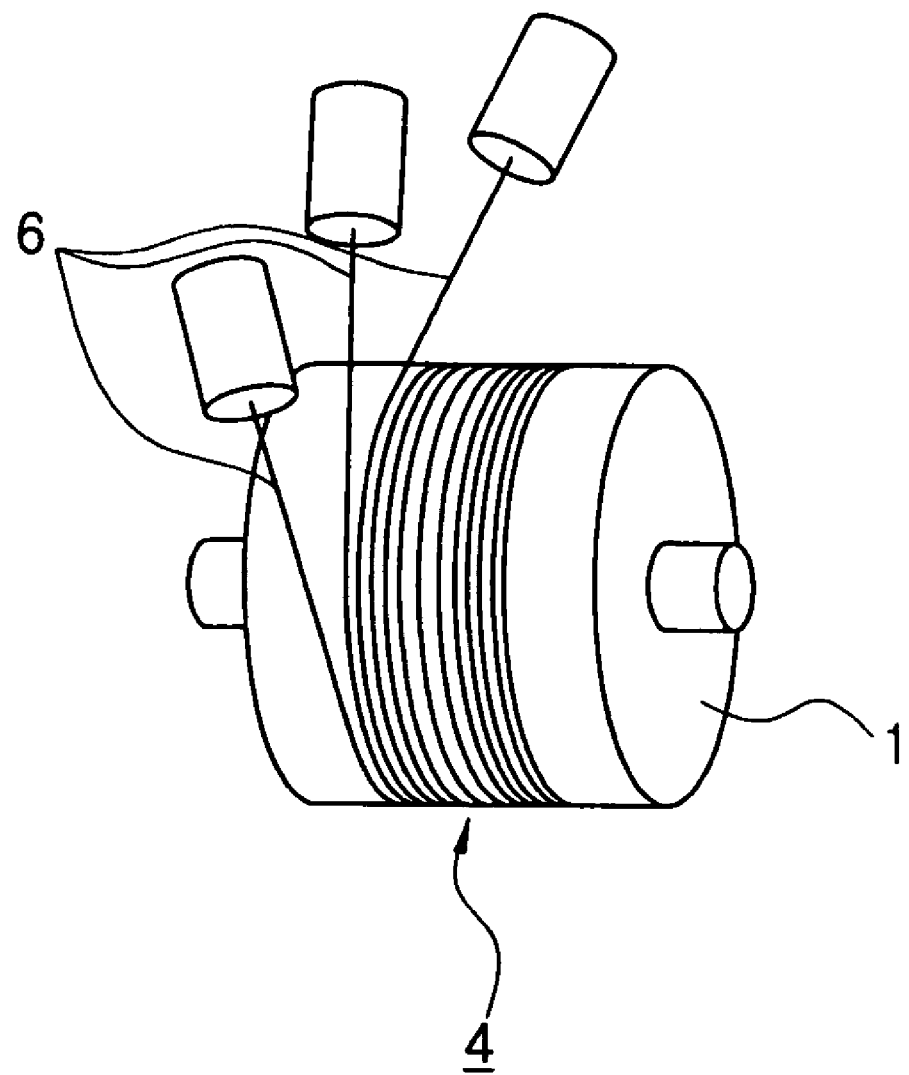
FIG. 3 is a view schematically illustrating the operation of forming a reinforcing belt by supplying a plurality of strands of untopped steel cord in accordance with the method according to the embodiment of the present invention.

FIG. 1 is a partial sectional view of a heavy-duty pneumatic tire manufactured by a method according to an embodiment of the present invention. FIG. 2 is a partially-cut and enlarged view showing main parts of the heavy-duty pneumatic tire according to the embodiment of the present invention. FIG. 3 is a view schematically illustrating the operation of forming a reinforcing belt by supplying a plurality of strands of untopped steel cord according to the method.

According to an embodiment of the present invention, a manufacturing method for the heavy-duty pneumatic tire forms a belt layer 5 including a reinforcing belt 4, by winding a plurality of strands of steel cord 6 between a second belt 2 and a third belt 3 which are wound on a forming drum 1. The manufacturing method further includes the operations of winding the second belt 2 attached with a lower rubber sheet 7 of the forming drum 1, supplying the plural strands of untopped steel cord 6 at one time and winding the steel cord 6 on the lower rubber sheet 7, thereby forming the reinforcing belt 4, arranging a weft yarn 8 in the form of waves on the reinforcing belt 4, and mounting an upper rubber sheet 9, which is pre-attached to the third belt 3, on the reinforcing belt 4 and the weft yarn 8.

Here, the untopped steel cord 6 refers to a steel cord without a rubber coating. Since the untopped steel cord 6 is used in the embodiment of the present invention instead of a conventional rubber-coated steel cord, the winding speed of the untopped steel cord 6 being supplied to the forming drum 1 can be enhanced, thereby reducing a forming time of the reinforcing belt 4.

According to the illustrated embodiment, each untopped steel cord 6 comprises a braid of plural strands of steel cord. However, as necessary, several strands of steel cord, for example 3 to 5 strands, may be simultaneously supplied to form the reinforcing belt 4.

Figure 4:
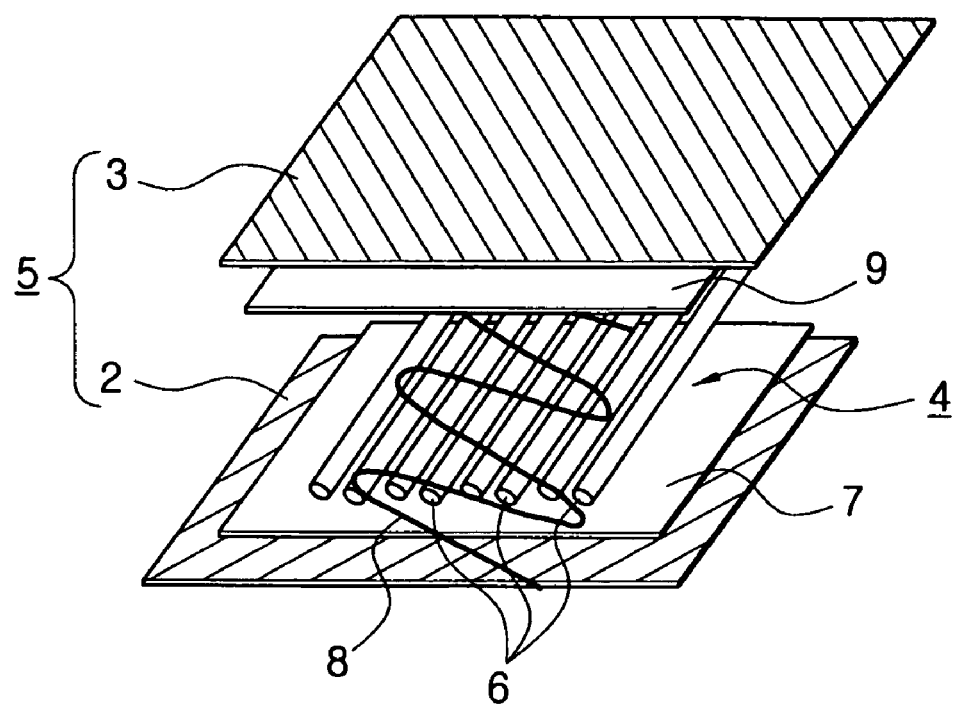
FIG. 4 is an exploded perspective view of a belt layer of the tire manufactured by the method according to the embodiment of the present invention.
Figure 5:
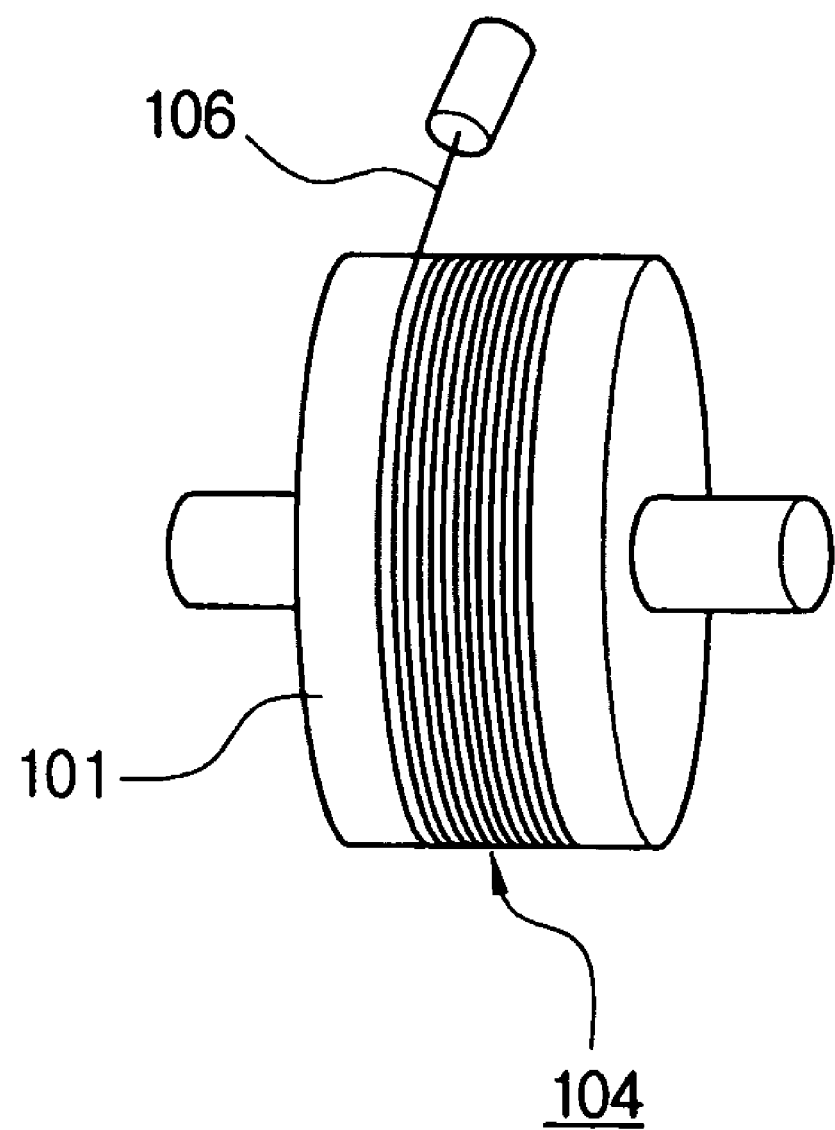
FIG. 5 and FIG. 6 are views schematically illustrating the operation of supplying a plurality of strands of steel cord and winding the steel cord on a forming drum, according to conventional arts.
Figure 6:
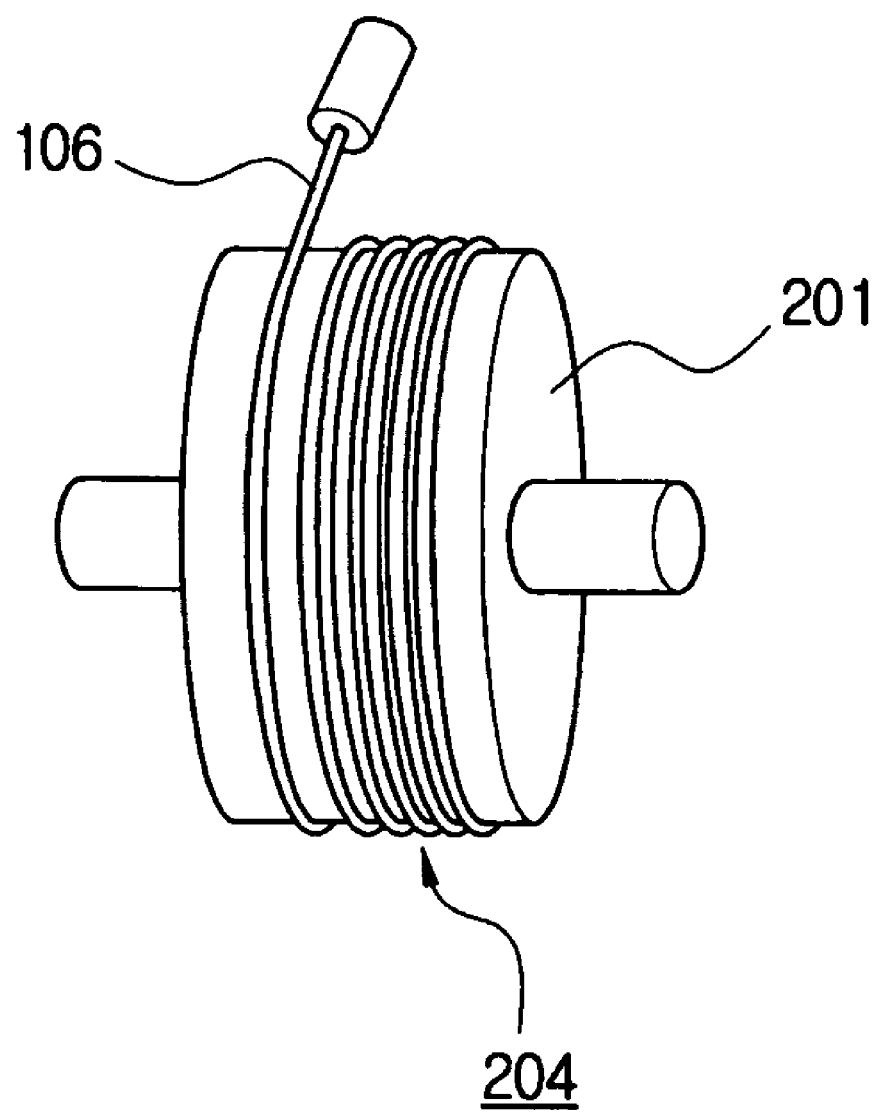

As shown in FIG. 4, the weft yarn 8 disposed between the reinforcing belt 4 and the upper rubber sheet 9 is formed as arranged in waves formed in a lateral direction with respect to the untopped steel cord 6 wound in a circumferential direction of the tire, that is, a width direction of the tire. Starting points and ending points of the respective strands of untopped steel cord 6 attached to the forming drum 1 are at different positions, more specifically, distanced from each other and attached to the lower rubber sheet 7 of the second belt 2.

The upper and lower rubber sheets 9 and 7 disposed respectively at upper and lower parts of the untopped steel cord 6 are formed thin and attached to upper and lower parts of the reinforcing belt 4, respectively, as pre-attached to the second belt 2 and the third belt 3.

The weft yarn 8, being a sort of thread, is mounted across the untopped steel cord 6 arranged in the waves of the lateral direction. Therefore, air pockets remaining in the reinforcing belt 4 during formation of the reinforcing belt 4 can be moved to the outside of the belt layer 5 through the weft yarn 8. More specifically, when the pluralities of strands of untopped steel cord 6 are wound, there remain some air pockets in spaces formed among the strands of untopped steel cord 6 after the tire formation or vulcanization operation. The remaining air pockets can easily be discharged through the weft yarn 8 attached to the reinforcing belt 4 in the lateral direction of the reinforcing belt 4, that is, the width direction of the tire.

A heavy-duty pneumatic tire according to an embodiment of the present invention is manufactured by the above-described method. More specifically, a flame is formed by connecting bead parts 11 disposed on both sides through a carcass 12, and a tread 13 and a side wall 14 are attached to the carcass 12. In addition, the reinforcing belt 4 is disposed in the belt layer 5 disposed between the tread 13 and the carcass 12. In the above-manufactured heavy-duty pneumatic tire, the lower rubber sheet 7 and the upper rubber sheet 9 are attached to an upper surface of the second belt 2 and a lower surface of the third belt 3, respectively. The plural strands of untopped steel cord 6 are supplied and wound between the upper and lower rubber sheets 9 and 7. The weft yarn 8 is disposed between the upper rubber sheet 9 and the reinforcing belt 4 comprising the untopped steel cord 6, thereby constructing the belt layer 5.

Here, the weft yarn 8 is disposed in waves along the width of the tire, that is, the lateral direction with respect to the reinforcing belt 4 formed in the circumferential direction of the tire. Also, the weft yarn 8 comprises a thread material.

The untopped steel cord 6 may comprise a single strand of steel cord or a braid of plural strands of steel cords.

As described above, according to the embodiment of the present invention, since a plurality of strands of steel cord are simultaneously supplied when forming a tread belt layer including a reinforcing belt, the manufacturing time can be reduced. Furthermore, by differently disposing starting points and ending points of the strands of steel cord being spirally wound, that is, by spacing the starting points and the ending points from each other, concentration of stress on the ends of the steel cord can be prevented. As a result, durability of the belt can be improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for manufacturing a heavy-duty pneumatic tire which is equipped with a belt layer including a reinforcing belt formed by winding a steel cord between a second belt and a third belt which are wound on a forming drum, the manufacturing method comprising:
    winding and attaching the second belt attached with a lower rubber sheet onto the forming drum;
    forming a reinforcing belt by simultaneously supplying and winding a plurality of strands of untopped steel cord on the lower rubber sheet; disposing a weft yarn on the reinforcing belt in the form of waves; and
    mounting an upper rubber sheet pre-attached to the third belt on the reinforcing belt and the weft yarn.

2. The manufacturing method according to claim 1, wherein the untopped steel cord comprises one braid of plural strands of steel cords.

3. The manufacturing method according to claim 1, wherein the untopped steel cord comprising one strand of steel cord is supplied simultaneously to form the reinforcing belt.

4. The manufacturing method according to claim 1, wherein, when the untopped steel cord is attached to the lower rubber sheet of the second belt, starting points and ending points of the respective strands of untopped steel cord being attached to the forming drum are disposed at different positions to be spaced apart from each other.

5. The manufacturing method according to claim 1, wherein the weft yarn is disposed in the form of waves extending in a lateral direction, that is, a width direction of the tire with respect to the untopped steel cord wound in a circumferential direction of the tire.

6. The manufacturing method according to claim 1, wherein the weft yarn comprises a thread.

* * * * *